United States Patent
Singh

(10) Patent No.: US 9,458,055 B2
(45) Date of Patent: *Oct. 4, 2016

(54) SOLAR-CONTROL GLAZING UNIT COMPRISING A LAYER OF A ZINC AND COPPER ALLOY

(71) Applicant: SAINT-GOBAIN GLASS FRANCE, Courbevoie (FR)

(72) Inventor: Laura Jane Singh, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/888,634

(22) PCT Filed: Apr. 30, 2014

(86) PCT No.: PCT/FR2014/051039
§ 371 (c)(1),
(2) Date: Nov. 2, 2015

(87) PCT Pub. No.: WO2014/177812
PCT Pub. Date: Nov. 6, 2014

(65) Prior Publication Data
US 2016/0068432 A1    Mar. 10, 2016

(30) Foreign Application Priority Data

May 3, 2013   (FR) ..................... 13 54094

(51) Int. Cl.
| | |
|---|---|
| *B32B 7/02* | (2006.01) |
| *B32B 9/00* | (2006.01) |
| *B32B 17/06* | (2006.01) |
| *C03C 27/00* | (2006.01) |
| *C03C 17/36* | (2006.01) |

(52) U.S. Cl.
CPC ......... *C03C 17/3649* (2013.01); *C03C 17/366* (2013.01); *C03C 17/3613* (2013.01); *C03C 17/3618* (2013.01); *C03C 17/3626* (2013.01); *C03C 17/3639* (2013.01); *C03C 17/3642* (2013.01); *C03C 17/3652* (2013.01); *C03C 17/3681* (2013.01); *C03C 2217/78* (2013.01)

(58) Field of Classification Search
None
See application file for complete search history.

(56) References Cited

U.S. PATENT DOCUMENTS

| | | |
|---|---|---|
| 2008/0112096 A1 | 5/2008 | Mizuno et al. |
| 2012/0094098 A1 | 4/2012 | Chang et al. |

FOREIGN PATENT DOCUMENTS

| | | |
|---|---|---|
| CN | 101830644 A | 9/2010 |
| CN | 102766893 A | 11/2012 |
| WO | WO 01/21540 A1 | 3/2001 |
| WO | WO 2006/039479 A1 | 4/2006 |
| WO | WO 2007/134843 A2 | 11/2007 |
| WO | WO 2013/057425 A1 | 4/2013 |

OTHER PUBLICATIONS

International Search Report as issued in International Patent Application No. PCT/FR2014/051039, dated Mar. 12, 2015.
Written Opinion of the International Searching Authority as issued in International Patent Application No. PCT/FR2014/051039, dated Mar. 12, 2015.

*Primary Examiner* — David Sample
*Assistant Examiner* — Nicole T Gugliotta
(74) *Attorney, Agent, or Firm* — Pillsbury Winthrop Shaw Pittman LLP

(57) ABSTRACT

A glazing unit with solar-control properties, includes at least one glass substrate on which a multilayer is deposited, the multilayer including a layer made of an alloy including zinc and copper, in which alloy the Zn/(Cu+Zn) atomic ratio is higher than 35% and lower than 65%.

17 Claims, No Drawings

SOLAR-CONTROL GLAZING UNIT COMPRISING A LAYER OF A ZINC AND COPPER ALLOY

CROSS-REFERENCE TO RELATED APPLICATIONS

This application is the U.S. National Stage of PCT/FR2014/051039, filed Apr. 30, 2014, which in turn claims priority to French patent application number 1354094 filed May 3, 2013. The content of these applications are incorporated herein by reference in their entireties.

The invention relates to the field of glass substrates or articles (in particular architectural glazing units) comprising, on their surface, thin-film coatings that give them solar-control properties. Such a glazing unit may also be applied to the automotive field. The expression "glazing unit" is understood, in the context of the present invention, to mean any glass product made of one or more glass substrates, and in particular single glazing units, double glazing units, triple glazing units, etc. Without departing from the scope of the invention, the glazing units may also be made of a hard plastic material. Alternatively, the multilayers according to the invention may be deposited on laminated plastic films (for example of PET), the film plus the multilayer then being added (adhesively bonded) to the surface of a glass substrate.

Such glazing units are equipped with thin-film multilayers that act on incident solar radiation by absorption and reflection. They are grouped under the designation solar-control glazing units. They are used either essentially to provide protection from the sun (anti-solar function) or essentially to insulate passenger compartments or dwellings thermally (low-E function).

The expression "anti-solar" is thus understood, in the context of the present invention, to mean the ability of the glazing unit to limit the energy flux, and in particular the infrared radiation (IR), passing through it from the exterior to the interior of the dwelling or passenger compartment.

The expression "low-E" is understood to mean a glazing unit equipped with at least one functional layer that gives it an emissivity $\in_n$ at normal incidence lower than 30% and preferably lower than 20%, the emissivity being defined by the relationship:

$$\in_n = 1 - R_n,$$

in which $R_n$ is the reflectance factor in the infrared between 5 and 50 microns at normal incidence (according to appendix A of international standard ISO 10292) to the glazing unit.

Generally, all the luminous and energetic properties presented in the present description are obtained according to the principles and methods described in international standards ISO 9050 (2003) and ISO 10292 (1994) and the corresponding European standards EN 410 (1998) and EN 673 (1998), relating to the determination of the luminous, solar and energetic properties of glazing units used in glass for buildings.

Furthermore, when associated with the glass substrate(s), these coatings must be esthetically pleasing, i.e. the glazing unit equipped with its multilayer must be sufficiently neutral in color, in transmission and/or reflection, not to inconvenience users, or alternatively have a blue or green tint, especially sought in the architectural field. These coatings in their simplest form are conventionally deposited by CVD deposition techniques or, most often at the present time, especially when the coating consists of a complex multilayer of successive layers the thicknesses of which must not exceed a few nanometers or a few tens of nanometers, by the vacuum sputtering techniques often referred to as magnetron sputtering in the field.

Most often the thin-film multilayers have solar-control properties essentially because of the intrinsic properties of one or more active layers, designated functional layers in the present description. The expression "active layer" or "functional layer" is thus understood to mean a layer that has a substantial effect on the flux of solar radiation passing through said glazing unit. Such an active layer, as is known, may function either mainly in a mode of infrared reflection, or mainly in a mode of infrared absorption. Most often, these anti-solar layers function in part by reflection and in part by absorption, as has been explained before.

In particular, the highest-performance multilayers that are commercially available at the present time incorporate at least one functional metal layer made of silver that essentially functions in a mode of reflection of most of the incident IR (infrared) radiation. Their normal emissivity does not exceed a few percent. These multilayers are thus mainly used in low-emissivity (low-E) glazing units to insulate buildings thermally. However, these layers are very sensitive to moisture and therefore exclusively used in double glazing units, on face 2 or 3 thereof, in order to be protected from moisture. Preferably, the multilayers according to the invention do not comprise such silver layers, or even layers of gold or platinum, or if they do then in very negligible amounts especially taking the form of unavoidable impurities.

Other metal films having an anti-solar function have also been reported in the field, comprising functional layers of Nb, Ta or W or of nitrides of these metals, such as for example described in patent application WO 01/21540. In such layers, the solar radiation is this time mainly absorbed unselectively by the one or more functional layers, i.e. IR radiation (i.e. radiation the wavelength of which is comprised between about 780 nm and 2500 nm) and visible radiation (the wavelength of which is comprised between about 380 and 780 nm) are absorbed indiscriminately. In such glazing units, the values of normal emissivity $\in_n$ are in general high. Lower emissivity values may only be obtained when the functional layer is relatively thick, in particular at least 20 nm thick for niobium metal. Because of the unselective absorption of the same film described above, the coefficients of light transmission $T_L$ of such glazing units are necessarily very low, generally very much lower than 30%. As a result, because of these properties, it would not appear possible to obtain, using such multilayers, solar-control glazing units combining relatively low normal emissivities, typically lower than 30%, and especially of about 25% or even 20%, while preserving a sufficiently high light transmission, i.e. typically higher than 30%.

Such glazing units comprising functional layers of Nb, Ta or W or nitrides of these metals thus have selectivities, such as illustrated by the ratio $T_L/g$, near 1 (light transmission factor/solar factor g, such as determined according to standard EN 410).

As is known and conventional, the light transmission factor or light transmission $T_L$ corresponds to the percentage of the incident light flux, i.e. in the wavelength range from 380 to 780 nm, passing through the glazing unit, under illuminant $D_{65}$.

As is equally well known, the solar factor g is equal to the ratio of the energy passing through the glazing unit (i.e. entering into the premises) to the incident solar energy. More particularly, it corresponds to the sum of the flux directly transmitted through the glazing unit and of the flux absorbed by the glazing unit (the multilayers of layers present on one of its surfaces in particular being included in this calculation) then reemitted toward the interior (the premises).

Patent document U.S. Pat. No. 4,943,484 describes multilayers the one or more functional layers of which may be made of an element chosen from aluminum, silver, gold or pure copper. The multilayers comprising thin layers made of pure copper however have the same problem as regards hydrolytic resistance as layers of precious metals.

According to a first aspect, the aim of the present invention is to provide glazing units comprising a multilayer giving them solar-control properties such as described above, i.e. a high light transmission $T_L$, typically higher than 30%, preferably higher than 40% and even higher than 50%, and a normal emissivity $\in_n$ lower than 30%, or lower than 20%, or even lower than 10%, said multilayer being durable over time, especially when it is placed directly on a face of the glazing unit exposed toward the interior or even the exterior of the building or passenger compartment, without particular precautions being required.

According to a second aspect, the aim of the present invention is to provide glazing units comprising a multilayer giving them anti-solar properties and having a high selectivity, as defined above, i.e. a ratio $T_L/g$ (often called selectivity in the field) very much higher than 1, in particular substantially higher than 1.2, even higher than 1.3 and ideally higher than 1.4 or even higher than 1.5, said multilayer being durable over time without particular precautions being required.

A glazing unit according to the invention thus advantageously allows the radiation passing through it to be selected, by promoting transmission of light waves, i.e. waves the wavelength of which is comprised between about 380 and 780 nm, and by absorbing selectively most infrared radiation, i.e. radiation the wavelength of which is longer than 780 nm, in particular near infrared radiation, i.e. radiation the wavelength of which is comprised between about 780 nm and about 1400 nm. By virtue of the installation of a glazing unit according to the present invention, it is thus possible to maintain high illumination of the room or passenger compartment protected by the glazing unit while minimizing the amount of heat entering therein.

According to another aspect, the glazing unit according to the present invention also has thermal insulation properties by virtue of the low-e properties of the layer used, allowing heat transfer, this time between the interior and exterior of the building, to be limited.

According to another advantage of the present invention, the glazing units equipped with multilayers according to the invention are simple to produce and also allow production costs to be substantially decreased relative to other known glazing units with anti-solar properties, especially those comprising a silver-based multilayer.

Alternatively, the glazing units according to the invention may also be used as low-e glazing units, in order to ensure thermal insulation of the passenger compartment or dwelling (low-e function), with regard to the low value of the emissivity coefficient $\in_n$ of the multilayers into which they are inserted.

Another aim of the present invention is to provide glass anti-solar glazing units incorporating a multilayer capable of undergoing a heat treatment such as a tempering or bending treatment, or more generally any heat treatment at temperatures higher than 550° C., or even at temperatures higher than 600° C., without losing its optical and energetic properties. In particular, glazing units equipped with layers according to the invention preferably preserve, after the heat treatment, a high light transmission, and preferably have a substantially unchanged color in transmission or reflection, this color preferably being substantially neutral or alternatively blue/green, such as is especially sought in the architectural sector.

Furthermore, they are resistant to moisture and to scratching. They may thus advantageously be single glazing units (a single glass substrate), the multilayer advantageously being turned toward the internal face of the building or the passenger compartment to be protected.

Of course, they may also be used in multiple glazing units, especially double or triple glazing units.

More precisely, the present invention relates to a glazing unit with solar-control properties, comprising at least one transparent, preferably glass, substrate on which a multilayer is deposited, said multilayer comprising a layer made of an alloy comprising zinc and copper, in which alloy the Zn/(Cu+Zn) atomic ratio is higher than 35% and lower than 65%.

Preferably, said atomic ratio is higher than 45%.

Preferably, said atomic ratio is lower than 60%.

Said film made of an alloy comprising zinc and copper is preferably the only functional layer of the multilayer, i.e. it is the origin of the solar-control properties of the glazing unit or at least most of said properties. In particular, the multilayers according to the invention preferably comprise no other low-e layers. In particular, multilayers according to the invention preferably do not comprise layers made of precious metals such as silver or gold.

According to preferred embodiments of the present invention, which may of course if needs be be combined with one another:

The thickness of said functional layer is comprised between 5 and 35 nanometers, preferably between 8 and 30 nanometers, in particular between 8 and 25 nanometers, or even between 10 and 20 nanometers.

The copper and zinc represent in total at least 80 at %, preferably at least 90 at %, or even at least 95 at %, of the metal elements present in the alloy.

The alloy is essentially or even only made of zinc and copper (any other elements then being present only in the form of unavoidable impurities).

The multilayer consists of the following layers in succession, from the surface of the glass substrate:
one or more lower protective films for protecting the alloy film from the migration of alkali-metal ions originating from the glass substrate, in particular made of dielectric materials such as oxides, nitrides or oxynitrides especially of at least one element chosen from zinc, tin, silicon, aluminum, titanium and zirconium, said one or more films having a physical thickness, in total, comprised between 5 and 150 nm;
said alloy film based on zinc and copper; and
one or more upper protective layers for protecting the alloy film from oxygen from the air, especially during a heat treatment such as a temper or an anneal, in particular made of dielectric materials such as oxides, nitrides or oxynitrides especially of at least one element chosen from zinc, tin, silicon, aluminum, titanium and zirconium, said one or more layers being of physical thickness, in total, comprised between 5 and 150 nm.

The one or more lower and upper protective layers are chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide $TiO_2$, and silicon oxynitrides $SiO_xN_y$.

The multilayer comprises the following layers in succession, from the surface of the glass substrate:
 a lower layer, of thickness comprised between 5 and 150 nm and preferably between 30 and 70 nm, of silicon nitride, optionally doped with Al, Zr and/or B, or of aluminum nitride AlN;
 said alloy layer based on zinc and copper; and
 an upper layer, of thickness comprised between 5 and 150 nm and preferably between 30 and 70 nm, of silicon nitride, optionally doped with Al, Zr and/or B, or of aluminum nitride AlN.

The multilayer comprises at least two alloy layers comprising, made essentially or made of zinc and copper such as described above, each of said layers being separated in the multilayer from the following by at least one intermediate film of a dielectric material, in particular one chosen from the above list.

Said intermediate layer comprises at least one layer of a material chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide and silicon oxynitrides $SiO_xN_y$.

The multilayer comprises the following layers in succession, from the surface of the glass substrate:
 one or more lower layers of total cumulative thickness smaller than 150 nm, chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide and silicon oxynitrides $SiO_xN_y$;
 a first functional layer based on the zinc-copper alloy such as described above, the thickness of said functional layer especially being comprised between 5 and 25 nm and preferably between 5 and 15 nm;
 an intermediate layer of thickness comprised between 5 and 150 nm, preferably between 5 and 50 nm, and more particularly between 5 and 15 nm, comprising at least one film of a material chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide, and silicon oxynitrides $SiO_xN_y$, preferably silicon nitride optionally doped with Al, Zr and/or B;
 a second functional layer based on the zinc-copper alloy, the thickness of said functional film especially being comprised between 5 and 25 nm and preferably between 5 and 15 nm; and
 one or more upper layers of total cumulative thickness smaller than 150 nm, chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide and silicon oxynitrides $SiO_xN_y$.

The multilayer comprises the following layers in succession, from the surface of the glass substrate:
 a lower layer, of thickness comprised between 5 and 150 nm and preferably between 30 and 70 nm, of silicon nitride, optionally doped with Al, Zr and/or B, or of aluminum nitride AlN;
 a first functional layer made of said alloy based on zinc and copper such as described above, the thickness of said functional film especially being comprised between 5 and 25 nm and preferably between 5 and 15 nm;
 an intermediate film of thickness comprised between 5 and 150 nm, preferably between 5 and 50 nm, and more particularly between 5 and 15 nm, comprising at least one layer of a material chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide $TiO_2$, and silicon oxynitrides $SiO_xN_y$, preferably silicon nitride optionally doped with Al, Zr and/or B;
 a second functional alloy layer comprising, mainly made or made of zinc and copper, the thickness of said functional layer especially being comprised between 5 and 25 nm and preferably between 5 and 15 nm; and
 an upper layer, of thickness comprised between 5 and 150 nm and preferably between 30 and 70 nm, of silicon nitride, optionally doped with Al, Zr and/or B, or of aluminum nitride AlN.

The multilayer furthermore comprises at least one additional protective layer for protecting the one or more alloy layers, said additional layer being made of a material chosen from the group made up of Ti, Mo, Al, Nb, Sn, Zn (or an alloy comprising two of these elements such as Sn and Zn) and NiCr, TiN and NbN, said additional protective layers being placed in contact and above and below the one or more functional layers, respectively, and having a physical thickness comprised between about 1 nm and about 3 nm. Such a protective layer especially makes it possible to limit, according to the invention, variations in the light transmission and color of the glazing unit, both in reflection and in transmission, when the latter is subjected/must be subjected to a heat treatment such as a tempering or bending treatment, etc.

A process for manufacturing an anti-solar glazing unit for example comprises the following steps:
 manufacturing a glass substrate; and
 depositing, on the glass substrate, a multilayer using a magnetron vacuum cathode sputtering technique, the anti-solar functional layer being obtained by sputtering a target made of a zinc-copper alloy, the atomic percentage of zinc in the Zn/(Cu+Zn) alloy being comprised between 35% and 65% and especially between 45 and 55%, in a residual atmosphere of a neutral gas such as argon.

The expression "made of" is, in the context of the present description, understood to mean that the alloy from which the functional layer is made comprises only or very predominantly only the elements copper and zinc, other elements then being present only in a very minor concentration not or almost not influencing the properties sought for the material. The expression "unavoidable impurities" is understood to mean the presence in the alloy in addition to zinc and copper of certain additional, in particular metal, elements that are unavoidable, typically because of the presence of these impurities in the sources of copper and zinc used initially or because of the method used to deposit the zinc-copper film. Generally, the atomic proportion of each of the elements considered to be an impurity in the alloy is smaller than 1 at %, is preferably smaller than 0.5 at % and very preferably is smaller than 0.1 at %.

The following examples are given purely by way of illustration and in no way limit in any of its described aspects the scope of the present invention. For the sake of comparison, all the multilayers of the examples that follow were synthesized on the same Planilux® glass substrate. All the films of the multilayers were deposited using well-known conventional magnetron vacuum sputtering techniques.

EXAMPLE 1

According to the Invention

In this example according to the invention, using conventional magnetron techniques, on a substrate made of Planilux® glass sold by the Applicant company, a multilayer consisting of the following sequence of layers is deposited:

$$Glass/Si_3N_4/Cu_{45}Zn_{55}{}^*/Si_3N_4$$

(30 nm) (10 nm) (10 nm)

*55 at % Zn, 45 at % copper

The functional metal layer made of zinc-copper alloy is obtained by magnetron sputtering two targets of zinc and copper placed in one and the same compartment of the device, each target having a specific power supply allowing the power applied to each target to be specifically and independently adjusted. It is thus possible to adjust the composition of the deposited layer by adjusting the power applied to each target. According to this first example, by way of information and for the apparatus used, the power applied to the zinc target was about 130 W and the power applied to the copper target was about 100 W. The upper and lower layers of silicon nitride are obtained in the same magnetron device by sputtering a silicon target comprising 8% by weight aluminum in compartments preceding and following that used to deposit the alloy layer. The silicon target is sputtered in a nitrogen atmosphere, in order to obtain the thin nitride film. No difficulty was observed during the deposition of the various layers by magnetron sputtering.

The composition of the metal alloy layer obtained was verified by electron probe microanalyzer (EPMA) and secondary ion mass spectrometry (SIMS).

The substrate equipped with its multilayer is then subjected to a heat treatment consisting in heating to 550° C. for 3 minutes.

EXAMPLE 2

According to the Invention

This example is produced in the same way as example 1 except that the powers were changed. The power applied to the zinc target was 110 W and the power applied to the copper target was 120 W. A multilayer is obtained the functional layer of which was this time made of an alloy of zinc and copper in respective molar proportions of 45/55. In the end a multilayer consisting of the following sequence of layers is obtained:

$$Glass/Si_3N_4/Cu_{55}Zn_{45}/Si_3N_4$$

(30 nm) (10 nm) (10 nm)

*55 at % copper, 45 at % zinc

The substrate equipped with its multilayer is then subjected to the same heat treatment as example 1.

EXAMPLE 3

Comparative

This example is produced in the same way as example 1 except that the powers were changed. The power applied to the zinc target was 80 W and the power applied to the copper target was 145 W. A multilayer is obtained the functional layer of which is this time made of an alloy of zinc and copper in respective molar proportions of 30/70.

More precisely, using conventional magnetron techniques, on the same Planilux® glass substrate, a multilayer consisting of the following sequence of layers is deposited:

$$Glass/Si_3N_4/Cu_{70}Zn_{30}{}^*/Si_3N_4$$

(30 nm) (10 nm) (10 nm)

*70 at % copper, 30 at % zinc

The substrate equipped with its multilayer is then subjected to the same heat treatment as example 1.

EXAMPLE 4

Comparative

This example is produced in the same way as example 1 except that the powers were changed. The power applied to the zinc target was 170 W and the power applied to the copper target was 55 W. A multilayer is obtained the functional layer of which is this time made of an alloy of zinc and copper in respective molar proportions of 70/30.

More precisely, using conventional magnetron techniques, on the same Planilux® glass substrate, a multilayer consisting of the following sequence of layers is deposited:

$$Glass/Si_3N_4/Cu_{30}Zn_{70}{}^*/Si_3N_4$$

(30 nm) (10 nm) (10 nm)

*30 at % copper, 70 at % zinc

The substrate equipped with its multilayer was then subjected to the same heat treatment as example 1.

EXAMPLE 5

Comparative

This example is produced in the same way as example 1 and a substantially identical multilayer is obtained by magnetron sputtering, except that the target used for the deposition of the functional layer was this time made only of copper.

More precisely, using conventional magnetron techniques, on the same Planilux® glass substrate, a multilayer consisting of the following sequence of layers is deposited:

$$Glass/Si_3N_4/Cu/Si_3N_4$$

(30 nm) (10 nm) (10 nm)

The substrate equipped with its multilayer is then subjected to the same heat treatment as example 1.

On the glazing units obtained according to examples 1 to 5, the light transmission factor $T_L$ and the sheet resistance of the multilayer were measured before and after the heat treatment, the sheet resistance being measured using the conventional four-point probe method. Conventionally, the sheet-resistance measurement is considered to give a first indication of the relative emissivities to expect for the various multilayers.

The results of the measurements carried out on the samples of examples 1 and 2 according to the invention and of the comparative examples 3 to 5 are collated in table 1 below:

TABLE 1

|  |  | Example 1 (invention) | Example 2 (invention) | Example 3 (comparative) | Example 4 (comparative) | Example 5 (comparative) |
|---|---|---|---|---|---|---|
| Functional layer | | $Cu_{45}Zn_{55}$ | $Cu_{55}Zn_{45}$ | $Cu_{70}Zn_{30}$ | $Cu_{30}Zn_{70}$ | Cu |
| Functional layer thickness (nm) | | 10 | 10 | 10 | 10 | 10 |
| $T_L$ (%) | Before temper | 58 | 52 | 60 | 20 | 60 |
|  | After temper | 63 | 60 | 65 | 22 | 65 |
| R/square ($\Omega/\square$) | Before temper | 13 | 20 | 20 | 50 | 7 |
|  | After temper | 9 | 13 | 12 | 38 | 5 |

To verify the chemical resistance of the functional layers deposited according to the preceding examples and after the heat treatment, each sample described above is subjected to a hydrolytic resistance test (climatic simulation) according to the following protocol:

In a closed chamber, the glazing unit equipped with its multilayer is subjected to severe temperature and humidity conditions (95% relative humidity at 50° C.) for a total length of time of 28 days, in order to cause accelerated ageing.

The results are given in table 2 below:

TABLE 2

|  |  | Example1 | Example2 | Example3 | Example4 | Example5 |
|---|---|---|---|---|---|---|
| Functional layer | | $Cu_{45}Zn_{55}$ | $Cu_{55}Zn_{45}$ | $Cu_{70}Zn_{30}$ | $Cu_{30}Zn_{70}$ | Cu |
| R/square ($\Omega/\square$) | Initial | 10 | 13 | 12 | 38 | 7 |
|  | 4 days | 11 | 15 | 13 | 40 | Insulating |
|  | 14 days | 15 | 19 | 21 | 147 |  |
|  | 30 days | 21 | 41 | 95 | Insulating |  |

Comparison of the data collated in tables 1 and 2 shows the advantages and the superiority related to use of a functional layer according to the invention.

In particular:

Comparison of the data collated in table 1 shows that glazing units comprising a functional layer according to the invention have light transmissions similar to that of copper layers, especially after annealing. The layer containing mainly zinc in contrast has a relatively low light transmission unsatisfactory for the application.

The measurements of the electrical conductivity and especially of R per square are relatively similar and low, except for the sample of example 4. The sample of example 1 in contrast has a particularly low resistance per square, which is similar to that of the reference sample of example 5 incorporating a functional layer made of pure copper.

The results of the tests collated in table 2 clearly indicate that the sample of reference example 5 is immediately degraded when it is subjected to a climatic resistance test. The samples of examples 3 and 4 have a slightly improved but very clearly unsatisfactory resistance. Only the samples of examples 1 and 2, in accordance with the present invention, exhibit a good hydrolytic resistance, and more particularly the sample of example 1, which exhibits only very small variations in its electrical conduction properties, even after the thirtieth day of testing.

EXAMPLE 6

According to the Invention

Using the same magnetron process, the following multilayer is synthesized on a piece of Planilux® glass:

Glass/$Si_3N_4$/Ti/$Zn_{49}Cu_{51}$*/Ti/$Si_3N_4$

— (40 nm) (1 nm) (27 nm) (1 nm) (52 nm)

*55 at % Zn, 45 at % copper

The functional metal layer made of zinc-copper alloy is obtained by magnetron sputtering a target made of an alloy comprising about 55 at % zinc and about 45 at % copper. The upper and lower layers of silicon nitride is obtained in the same magnetron device by sputtering a silicon target comprising 8% by weight aluminum in compartments preceding and following that used to deposit the alloy. The sputtering of the silicon target is carried out in a nitrogen atmosphere, in order to obtain the thin nitride film.

The titanium film is obtained by magnetron sputtering a metal titanium target.

Analysis by electron probe microanalyzer and SIMS of the film finally obtained indicates that its composition corresponds to the molar stoichiometry $Zn_{49}Cu_{51}$, slightly different from that of the initial target.

The substrate equipped with its multilayer was subjected to a heat treatment consisting in a heat treatment at 620° C. for 8 minutes then removal from the oven. This treatment is representative of the conditions undergone industrially by a glazing unit if the latter must be tempered.

The thermal and luminous properties of the unit were then measured according to the standard EN410 cited above.

The data measured for the sample of example 6 are collated in table 3 below:

TABLE 3

| Light transmission $T_L$ (%) | Emissivity (%) | Solar factor g (%) | Selectivity $T_L/g$ |
|---|---|---|---|
| 50 | 4.4 | 29 | 1.72 |

A very high selectivity of about 1.72 was measured for a glazing unit equipped with the multilayer according to the invention.

By way of comparison, for a conventional multilayer comprising a silver film of 18 nanometers in the following succession of films:
Planilux/$Si_3N_4$(45 nm)/NiCr (2)/Ag(18)/NiCr(1)/$Si_3N_4$(30)/$TiO_x$(9), the following parameters were measured:
$T_L=51$ and g=33, i.e. a selectivity s=1.54.

The invention claimed is:

1. A glazing unit with solar-control properties, comprising at least one glass substrate on which a multilayer is deposited, said multilayer comprising a layer made of a metal alloy comprising zinc and copper, in which metal alloy the Zn/(Cu+Zn) atomic ratio is higher than 35% and lower than 65%, and in which the copper and zinc represent in total at least 80 at % of the metal elements present in the metal alloy.

2. The glazing unit with solar-control properties as claimed in claim 1, comprising a layer made of an alloy comprising zinc and copper in which the Zn/(Cu+Zn) atomic ratio is higher than 45% and lower than 60%.

3. The glazing unit with solar-control properties as claimed in claim 1, wherein a thickness of said alloy layer is comprised between 5 and 35 nanometers.

4. The glazing unit with solar-control properties as claimed in claim 1, wherein the copper and zinc represent in total at least 90 at % of the metal elements present in the alloy.

5. The glazing unit with solar-control properties as claimed in claim 1, wherein the alloy comprises only zinc, copper and unavoidable impurities.

6. The glazing unit with solar-control properties as claimed in claim 1, wherein said multilayer does not comprise layers made of precious metals.

7. The glazing unit with solar-control properties as claimed in claim 1, wherein the multilayer consists of the following layers in succession, from the surface of the glass substrate:

one or more lower protective layers for protecting a functional layer from migration of alkali-metal ions originating from the glass substrate, of geometric thickness, in total, comprised between 5 and 150 nm;

said alloy layer; and one or more upper protective layers for protecting the functional layer from oxygen from the air, during a heat treatment, said one or more upper protective layers being of geometric thickness, in total, comprised between 5 and 150 nm.

8. The glazing unit with solar-control properties as claimed in claim 7, wherein the one or more lower and upper protective layers are chosen from silicon nitride, optionally doped with Al, Zr and/or B, aluminum nitride AlN, tin oxide, a mixed tin zinc oxide, silicon oxide, titanium oxide and silicon oxynitrides.

9. The glazing unit with solar-control properties as claimed in claim 1, wherein the multilayer comprises the following layers in succession, from the surface of the glass substrate:

a lower layer, of thickness comprised between 5 and 150 nm, of silicon nitride, optionally doped with Al, Zr and/or B, or of aluminum nitride AlN;

said alloy layer; and an upper layer, of thickness comprised between 5 and 150 nm, of silicon nitride, optionally doped with Al, Zr and/or B, or of aluminum nitride AlN.

10. The glazing unit with solar-control properties as claimed in claim 1, wherein the multilayer comprises at least two functional layers made of said metal alloy, each of said least two functional layers being separated in the multilayer from the following by at least one intermediate layer of a dielectric material.

11. The glazing unit with solar-control properties as claimed in claim 10, wherein said intermediate layer comprises at least one layer of a material chosen from silicon nitride, optionally doped with Al, Zr and/or B, aluminum nitride, tin oxide, a mixed tin zinc oxide, silicon oxide, titanium oxide and a silicon oxynitride.

12. The glazing unit with solar-control properties as claimed in claim 1, wherein the multilayer comprises the following layers in succession, from the surface of the glass substrate:

a lower layer, of thickness comprised between 5 and 150 nm, of silicon nitride, optionally doped with Al, Zr and/or B, or of aluminum nitride AlN;

a first functional layer made of said metal alloy;

an intermediate layer, of thickness comprised between 5 and 150 nm, comprising at least one layer of a material chosen from silicon nitride, optionally doped with Al, Zr and/or B, aluminum nitride AlN, tin oxide, a mixed tin zinc oxide $Sn_yZn_zO_x$, silicon oxide $SiO_2$, titanium oxide $TiO_2$, silicon oxynitrides $SiO_xN_y$, and optionally doped silicon nitride;

a second functional layer made of said metal alloy; and an upper layer, of thickness comprised between 5 and 150 nm, of silicon nitride, optionally doped with Al, Zr and/or B, or of aluminum nitride AlN.

13. The glazing unit with solar-control properties as claimed in claim 1, wherein the multilayer further comprises one or more additional protective layers for protecting the alloy layer, said one or more additional protective layers being made of a material chosen from the group made up of Ti, Mo, Al, Nb, Sn, Zn and their alloys and NiCr, TiN and NbN, said one or more additional protective layers being placed in contact and above and/or below the alloy layer, respectively, and having a geometric thickness comprised between about 1 nm and about 5 nm.

14. The glazing unit with solar-control properties as claimed in claim 3, wherein the thickness is comprised between 8 and 25 nanometers.

15. The glazing unit with solar-control properties as claimed in claim 7, wherein the heat treatment is a temper or an anneal.

16. The glazing unit with solar-control properties as claimed in claim 9, wherein the thickness of the lower layer is comprised between 30 and 70 nm and the thickness of the upper layer is comprised between 30 and 70 nm.

17. The glazing unit with solar-control properties as claimed in claim 12, wherein the thickness of the lower layer is comprised between 30 and 70 nm and the thickness of the upper layer is comprised between 30 and 70 nm.

* * * * *